(12) United States Patent
Endo

(10) Patent No.: US 12,124,280 B2
(45) Date of Patent: Oct. 22, 2024

(54) GROUP SENSOR CONTROL SYSTEM

(71) Applicant: MITSUBISHI HEAVY INDUSTRIES, LTD., Tokyo (JP)

(72) Inventor: Shun Endo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 212 days.

(21) Appl. No.: 17/926,006

(22) PCT Filed: Mar. 29, 2021

(86) PCT No.: PCT/JP2021/013414
§ 371 (c)(1),
(2) Date: Nov. 17, 2022

(87) PCT Pub. No.: WO2021/235103
PCT Pub. Date: Nov. 25, 2021

(65) Prior Publication Data
US 2023/0176592 A1 Jun. 8, 2023

(30) Foreign Application Priority Data
May 19, 2020 (JP) .................................. 2020-087450

(51) Int. Cl.
*G05D 1/00* (2024.01)
(52) U.S. Cl.
CPC ........... *G05D 1/104* (2013.01); *G05D 1/0022* (2013.01)
(58) Field of Classification Search
CPC .............................. G05D 1/104; G05D 1/0022
See application file for complete search history.

(56) References Cited

U.S. PATENT DOCUMENTS 5,320,538 A * 6/1994 Baum .................. H04N 13/344
345/8
6,308,045 B1 * 10/2001 Wright ................. G08G 5/0013
455/431
(Continued)

FOREIGN PATENT DOCUMENTS

JP 9-257923 10/1997
JP 2000-292533 10/2000
(Continued)

OTHER PUBLICATIONS

English translation of International Search Report issued Jun. 8, 2021 in International Application No. PCT/JP2021/013414.
(Continued)

*Primary Examiner* — Gertrude Arthur Jeanglaude
(74) *Attorney, Agent, or Firm* — Wenderoth, Lind & Ponack, L.L.P.

(57) ABSTRACT

A sensor can be mounted in an aircraft to detect an object to be detected. A sensor control part is mounted in the aircraft and controls the sensor, and a communication part is mounted in the aircraft. The communication part can communicate with a communication part of another aircraft to form a communication network. The plurality of sensor control parts share, via the communication network, setting information of a master aircraft of the plurality of aircrafts, and of a follower aircraft which is a follower of the master aircraft. The sensor control part of the master aircraft transmits, via the communication network, instruction information for instructing a control policy of a group sensor to the sensor control part of the follower aircraft, and the sensor control part of the follower aircraft carries out a control of the sensor based on the instruction information.

10 Claims, 4 Drawing Sheets

(56) References Cited

U.S. PATENT DOCUMENTS

| | | | |
|---|---|---|---|
| 8,509,140 B2* | 8/2013 | Kauffman | H04B 7/18506 |
| | | | 455/431 |
| 2006/0114324 A1* | 6/2006 | Farmer | G01S 7/003 |
| | | | 709/201 |
| 2008/0129497 A1* | 6/2008 | Woodard | G08B 25/085 |
| | | | 340/540 |
| 2011/0276199 A1* | 11/2011 | Brot | G05D 1/0077 |
| | | | 701/3 |
| 2012/0268318 A1 | 10/2012 | Jin et al. | |
| 2018/0205658 A1* | 7/2018 | Sullivan | H04L 67/12 |
| 2019/0227175 A1* | 7/2019 | Steinberg | G01S 17/89 |

FOREIGN PATENT DOCUMENTS

| | | |
|---|---|---|
| JP | 2011-75300 | 4/2011 |
| JP | 2012-230098 | 11/2012 |

OTHER PUBLICATIONS

Written Opinion issued Jun. 8, 2021 in International Application No. PCT/JP2021/013414, with English translation.

* cited by examiner

FIG. 4

| AIRCRAFT | S1 | S4 | S6 | S8 | S10 | CONTROL RESULT | ROLE |
|---|---|---|---|---|---|---|---|
| A | NO | - | - | - | - | GROUP SENSOR CONTROL INSTRUCTION BY HOST AIRCRAFT IS EXECUTED BASED ON POSITION INFORMATION, SENSOR INFORMATION, AND THE LIKE OF HOST AIRCRAFT, AND SENSOR OF HOST AIRCRAFT IS CONTROLLED ACCORDING TO ALGORITHM | MASTER OF [A] |
| B | YES | YES | YES | YES | - | GROUP SENSOR CONTROL INSTRUCTION BY HOST AIRCRAFT IS EXECUTED BASED ON SHARED POSITION INFORMATION, SENSOR INFORMATION, AND THE LIKE, AND SENSOR OF HOST AIRCRAFT IS CONTROLLED ACCORDING TO ALGORITHM | MASTER OF [B] |
| C | NO | - | - | - | - | GROUP SENSOR CONTROL INSTRUCTION BY HOST AIRCRAFT IS EXECUTED BASED ON POSITION INFORMATION, SENSOR INFORMATION, AND THE LIKE OF HOST AIRCRAFT, AND SENSOR OF HOST AIRCRAFT IS CONTROLLED ACCORDING TO ALGORITHM | MASTER OF [C] |
| D | YES | NO | - | - | - | GROUP SENSOR CONTROL INSTRUCTION BY HOST AIRCRAFT IS EXECUTED BASED ON POSITION INFORMATION, SENSOR INFORMATION, AND THE LIKE OF HOST AIRCRAFT, AND SENSOR OF HOST AIRCRAFT IS CONTROLLED ACCORDING TO ALGORITHM | MASTER OF [D] |

| AIRCRAFT | S1 | S4 | S6 | S8 | S10 | CONTROL RESULT | ROLE |
|---|---|---|---|---|---|---|---|
| A | YES | YES | YES | YES | - | GROUP SENSOR CONTROL INSTRUCTION BY HOST AIRCRAFT IS EXECUTED BASED ON SHARED POSITION INFORMATION, SENSOR INFORMATION, AND THE LIKE, AND SENSOR OF HOST AIRCRAFT IS CONTROLLED ACCORDING TO ALGORITHM | MASTER OF [A,B] |
| B | YES | YES | NO | - | NO | ACCORDING TO GROUP SENSOR CONTROL INSTRUCTION BY OTHER AIRCRAFT, SENSOR OF HOST AIRCRAFT IS CONTROLLED ACCORDING TO ALGORITHM | FOLLOWER OF [A,B] |
| C | NO | - | - | - | - | GROUP SENSOR CONTROL INSTRUCTION BY HOST AIRCRAFT IS EXECUTED BASED ON POSITION INFORMATION, SENSOR INFORMATION, AND THE LIKE OF HOST AIRCRAFT, AND SENSOR OF HOST AIRCRAFT IS CONTROLLED ACCORDING TO ALGORITHM | MASTER OF [C] |
| D | YES | NO | - | - | - | GROUP SENSOR CONTROL INSTRUCTION BY HOST AIRCRAFT IS EXECUTED BASED ON POSITION INFORMATION, SENSOR INFORMATION, AND THE LIKE OF HOST AIRCRAFT, AND SENSOR OF HOST AIRCRAFT IS CONTROLLED ACCORDING TO ALGORITHM | MASTER OF [D] |

GROUP SENSOR CONTROL SYSTEM

TECHNICAL FIELD

The present disclosure relates to a group sensor control system.

BACKGROUND ART

In the related art, a sensor group management device that manages a sensor group including a plurality of sensors and observes a plurality of targets has been known (for example, refer to PTL 1).

CITATION LIST

Patent Literature

[PTL 1] Japanese Unexamined Patent Application Publication No. 9-257923

SUMMARY OF INVENTION

Technical Problem

However, in PTL 1, since a plurality of sensors are managed by a sensor group management device, when a function of the sensor group management device is stopped due to a failure or the like, a group control of the plurality of sensors is also stopped.

Therefore, an object of the present disclosure is to provide a group sensor control system having high redundancy.

Solution to Problem

According to an aspect of the present disclosure, there is provided a group sensor control system controlling a plurality of sensors installed in each of a plurality of aircraft as a group sensor, the group sensor control system including: the sensor that is mounted on each of the plurality of aircraft to detect an object to be detected; a sensor control unit that is mounted on each of the plurality of aircraft to control the sensor; and a communication unit that is mounted on each of the plurality of aircraft, in which the communication unit is communicable with the communication units of other aircraft and forms a communication network between the communication units of the plurality of aircraft by communication, a plurality of the sensor control units share, via the communication network, setting information of a master aircraft which is a main aircraft among the plurality of aircraft and in which a master authority is set and of a follower aircraft which is a follower of the master aircraft, and the sensor control unit of the master aircraft transmits instruction information for providing an instruction for a control policy of the group sensor to the sensor control unit of the follower aircraft via the communication network, and the sensor control unit of the follower aircraft executes a control of the sensor based on the instruction information received via the communication network.

Advantageous Effects of Invention

According to the present disclosure, redundancy can be high.

BRIEF DESCRIPTION OF DRAWINGS

FIG. 4 is an explanatory diagram of an example relating to the transfer of the group sensor control authorities between aircraft.

DESCRIPTION OF EMBODIMENTS

Hereinafter, an embodiment according to the present disclosure will be described in detail with reference to the drawings. The present invention is not limited to this embodiment. In addition, components in the following embodiment include those that can be easily replaced by those skilled in the art, or those that are substantially the same. Further, the components described below can be appropriately combined, and when there are a plurality of embodiments, the embodiments can be combined.

Present Embodiment

Figure 1:
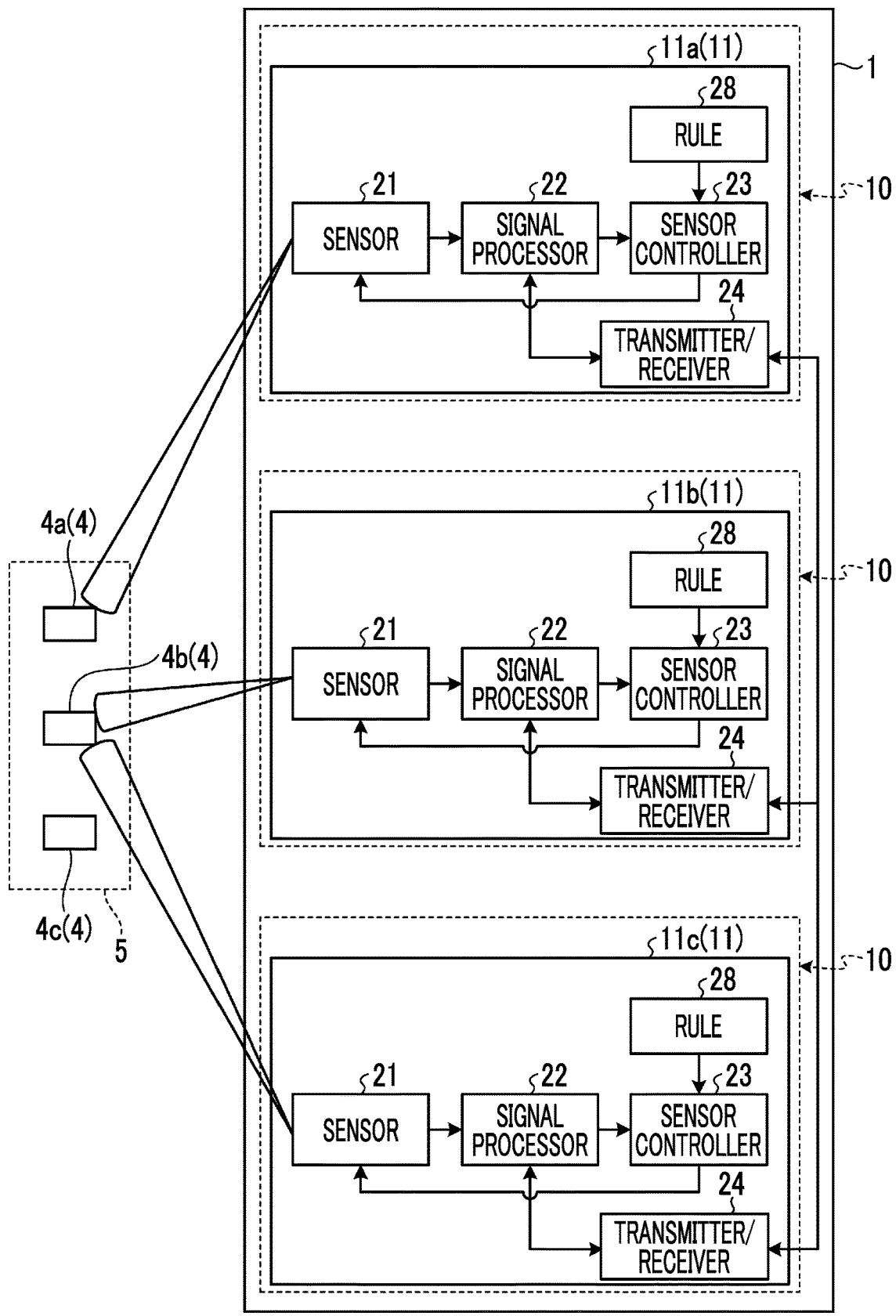
FIG. 1 is a schematic configuration diagram schematically showing a group sensor control system according to the present embodiment.

FIG. 1 is a schematic configuration diagram schematically showing a group sensor control system according to the present embodiment. As shown in FIG. 1, a group sensor control system 1 according to the present embodiment is a system that controls a group sensor including a plurality of sensors 21. The group sensor control system 1 controls, for example, a plurality of sensors 21 mounted on a plurality of aircraft.

(Group Sensor Control System)

The group sensor control system 1 includes a plurality of sensor devices 11 mounted on a plurality of aircraft 10. The group sensor control system 1 controls to execute a search for detecting a target group 5 including a plurality of target objects 4 as an object to be detected, and to execute tracking of the detected target object 4.

The sensor device 11 includes a sensor 21, a signal processor 22, a sensor controller (sensor control unit) 23, and a transmitter/receiver (communication unit) 24.

For example, a sensor such as a radar or an infrared sensor is applied to the sensor 21, and the sensor 21 is a sensor for detecting the target object 4.

The signal processor 22 processes a detected signal input from the sensor 21 and the transmitter/receiver 24, and outputs the processed detected signal to the sensor controller 23 and the transmitter/receiver 24. The signal processor 22 may be configured to include, for example, a transducer, a signal processing device including an integrated circuit, and the like.

The sensor controller 23 controls the sensor 21 based on the detected signal input from the signal processor 22. Further, the sensor controller 23 controls the sensor 21 based on a rule 28, which is instruction information for providing an instruction for a control policy of the group sensor. The sensor controller 23 includes, for example, an integrated circuit such as a Central Processing Unit (CPU). The sensor controller 23 independently executes the sensor control based on an algorithm that determines the sensor control of the sensor 21. Meanwhile, the sensor controller 23 executes a coordinated control with the sensor devices 11 of other aircraft 10 based on the rule 28.

The transmitter/receiver 24 transmits/receives various data such as sensor information acquired by the sensor device 11 to/from the transmitter/receivers 24 of the sensor devices 11 of other aircraft 10. For the transmitter/receiver 24, for example, a communication module is applied. The plurality of transmitters/receivers 24 in the plurality of aircraft 10 form a communication network. The sensor device 11 of each aircraft 10 shares the sensor information acquired by the sensor devices 11 of other aircraft 10 in the communication network. The sensor information includes, for example, position information of the target object 4 and speed information of the target object 4. In addition to the sensor information, the transmitter/receiver 24 transmits/receives position information of the aircraft 10, speed information of the aircraft 10, and identification information of the aircraft 10.

As shown in FIG. 1, the group sensor control system 1 described above executes group sensor control for detecting the target group 5 including three target objects 4a, 4b, and 4c, for example. The group sensor control system 1 includes, for example, three sensor devices 11a, 11b, and 11c mounted on three aircraft 10. Each of the three sensor devices 11a, 11b, and 11c executes the sensor control based on the algorithm according to the control policy of the group sensor based on the rule 28.

Figure 2:
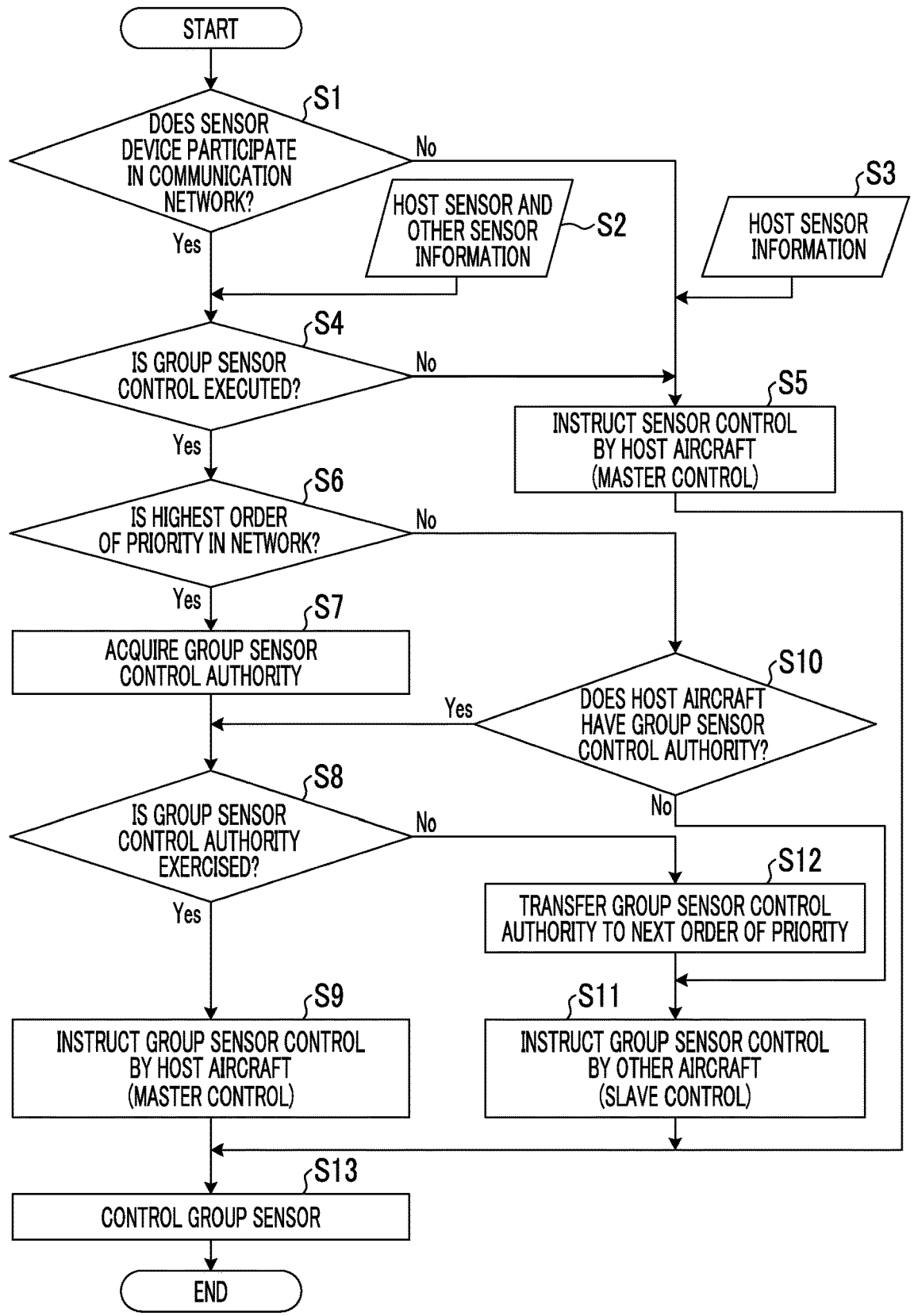
FIG. 2 is a flowchart relating to a group sensor control of the group sensor control system according to the present embodiment.

Next, the group sensor control of the group sensor control system 1 will be described with reference to FIG. 2. FIG. 2 is a flowchart relating to the group sensor control of the group sensor control system according to the present embodiment. The group sensor control system 1 periodically and repeatedly executes the control shown in FIG. 2. In the group sensor control system 1 of the present embodiment, the plurality of aircraft 10 are separated into a main master aircraft and a follower aircraft which is a follower of the master aircraft in the communication network. The master aircraft and the follower aircraft are set in each aircraft 10 based on priorities assigned in advance. The master aircraft is the aircraft 10 that provides the rule 28 to the follower aircraft, and the follower aircraft performs sensor control based on the rule 28 provided from the master aircraft.

The sensor device 11 in each of the plurality of aircraft 10 determines whether or not the sensor device 11 participates in the communication network (Step S1). In Step S1, it is determined whether or not each sensor device 11 participates depending on whether or not each sensor device 11 is connected to the communication network constructed by the plurality of sensor devices 11.

When it is determined that the sensor device 11 participates in the communication network (Step S1: Yes), the sensor device 11 acquires sensor information from a host aircraft and other aircraft (another aircraft) 10 shared in the communication network (Step S2). In Step S2, the sensor information is acquired from the host aircraft and other aircraft, but the sensor information may be acquired only from other aircraft. Meanwhile, when it is determined that the sensor device 11 does not participate in the communication network (Step S1: No), the sensor device 11 acquires the sensor information from the sensor 21 of the host aircraft (Step S3).

Further, when it is determined that the sensor device 11 participates in the communication network (Step S1: Yes), the sensor device 11 determines whether or not to execute the group sensor control together with the execution of Step S2 (Step S4). When the sensor device 11 determines that the group sensor control is executed (Step S4: Yes), the sensor device 11 executes the following step of separating the master aircraft 10 and the follower aircraft 10. In Step S4, whether or not the group sensor control is executed is determined based on an operation by an operator of the aircraft 10, for example.

When it is determined in Step S1 that the sensor device 11 does not participate in the communication network (Step S1: No), or when it is determined in Step S4 that the group sensor control is not executed (Step S4: No), the sensor device 11 gives an instruction to be a control policy of a group sensor that the host aircraft alone executes the sensor control based on the algorithm (Step S5). That is, the control policy of the group sensor includes the sensor control by the host aircraft alone, and when the group sensor control is not executed, the sensor device 11 executes the sensor control by the host aircraft alone. Specifically, in Step S5, the rule 28 becomes a rule in which the aircraft 10 that does not execute the group sensor control executes the sensor control by the host aircraft alone and is set as a single master aircraft. Therefore, in Step S5, it is instructed to execute the sensor control based on the algorithm according to the control policy that the host aircraft is the single master aircraft 10. Further, in Step S5, when it is determined in Step S1 that the sensor device 11 does not participate in the communication network (Step S1: No), in Step S3, the sensor device 11 gives an instruction to execute the sensor control based on the sensor information acquired by the host aircraft. Meanwhile, in Step S5, when it is determined in Step S4 that the group sensor control is not executed (Step S4: No), in Step S2, the sensor device 11 gives an instruction to execute the sensor control based on the sensor information acquired from the host aircraft and other aircraft.

When it is determined in Step S4 that the group sensor control is executed (Step S4: Yes), the sensor device 11 determines whether or not an order of priority of the host aircraft is the highest in the communication network (Step S6). When it is determined that the order of priority of the host aircraft is the highest (Step S6: Yes), the sensor device 11 acquires a group sensor control authority (master authority), which is the authority to set the rule 28, that is, the authority for providing an instruction for the control policy of the group sensor (Step S7). That is, in Step S7, the host aircraft 10 is set as the master aircraft by acquiring the group sensor control authority.

After executing Step S7, the sensor device 11 determines whether or not to exercise the group sensor control authority as the master aircraft (Step S8). When the sensor device 11 determines that the group sensor control authority is to be exercised as the master aircraft (Step S8: Yes), the sensor device 11 instructs to realize the control policy of the group sensor to execute the sensor control based on the algorithm with the host aircraft as the master aircraft. (Step S9).

Meanwhile, when it is determined in Step S6 that the order of priority of the host aircraft is not the highest (Step S6: No), the sensor device 11 determines whether or not the host aircraft has the group sensor control authority (Step S10). When the sensor device 11 determines that the host aircraft has the group sensor control authority (Step S10: Yes), the sensor device 11 proceeds to Step S8. Meanwhile, when the sensor device 11 determines that the host aircraft does not have the group sensor control authority (Step S10: No), the sensor device 11 receives an instruction of the control policy of the group sensor to execute the sensor control based on the algorithm with other aircraft as the master aircraft (Step S11). That is, in Step S11, the host aircraft 10 that does not have the group sensor control authority is set as the follower aircraft.

Further, when the sensor device 11 determines in Step S8 that the group sensor control authority is not exercised as the master aircraft (Step S8: No), the sensor device 11 transfers the group sensor control authority to the aircraft 10 having the next order of priority (Step S12). That is, in Step S12, the group sensor control authority is transferred to the follower aircraft having the highest order of priority from the follower aircraft remaining in the communication network. After executing Step S12, the sensor device 11 proceeds to Step S11.

The sensor device 11 executes the group sensor control based on the algorithm according to the rule 28 which is the control policy instructed in Step S5, Step S9, or Step S11 (Step S13). After the execution of Step S13, the plurality of aircraft 10 execute the sensor control based on the group sensor control.

By the above group sensor control, the plurality of aircraft 10 is separated into any one of the master aircraft that independently executes sensor control, the master aircraft that executes the sensor control in the group sensor, and a follower aircraft that executes the sensor control in the group sensor.

Figure 3:
FIG. 3 is an explanatory diagram of an example relating to transfer of group sensor control authorities between aircraft.

Next, the transfer of the group sensor control authority between the aircraft 10 will be described with reference to FIGS. 3 and 4. FIGS. 3 and 4 are explanatory diagrams of an example relating to the transfer of the group sensor control authority between the aircraft. In addition, in FIGS. 3 and 4, the group sensor control by four aircraft 10 of aircraft A, B, C, and D will be described as an example. At this time, the order of priority is aircraft A, B, C, D in descending order.

In FIG. 3, the aircraft A, B, C, and D execute the sensor control based on the determination results of Step S1, Step S4, Step S6, Step S8, and Step S10 in FIG. 2. FIG. 3 shows, in order from a left side, there are items of the aircraft, determination results in Step S1, Step S4, Step S6, Step S8, and Step S10, results of the group sensor control, and a role. Further, in FIG. 3, the upper side thereof shows a state before the master aircraft leaves, and the lower side thereof shows the state after the master aircraft leaves.

As shown in FIG. 3, since the aircraft A is No in Step S1, the aircraft A is the master aircraft that independently executes the sensor control. Therefore, the aircraft A executes the sensor control of the host aircraft based on the algorithm according to the instruction of the group sensor control of the host aircraft based on the position information of the host aircraft and the sensor information of the host aircraft.

Since the aircraft B is Yes in Step S1, Yes in Step S4, Yes in Step S6, and Yes in Step S8, the aircraft B is the master aircraft that executes the sensor control by the group sensor. Therefore, the aircraft B executes the sensor control of the host aircraft based on the algorithm according to the instruction of the group sensor control of the host aircraft based on the shared sensor information such as the position information of the shared aircraft 10.

Since the aircraft C is Yes in Step S1, Yes in Step S4, No in Step S6, and No in Step S10, the aircraft C is the follower aircraft that executes the sensor control by the group sensor. Therefore, the aircraft C executes the sensor control of the host aircraft based on the algorithm according to the instruction of the group sensor control of other aircraft based on the shared sensor information such as the position information of the shared aircraft 10.

Since the aircraft D is Yes in Step S1 and No in Step S4, it is a master aircraft that independently executes the sensor control. Therefore, the aircraft D executes the sensor control of the host aircraft based on the algorithm according to the instruction of the group sensor control of the host aircraft based on the shared sensor information such as the position information of the shared aircraft 10.

From the above, the aircraft A functions as the master aircraft of the aircraft A. The aircraft B functions as the master aircraft of the aircraft B and the aircraft C. The aircraft C functions as the follower aircraft of the aircraft B and the aircraft C. The aircraft D functions as the master aircraft of the aircraft D.

Here, as shown in the lower side of FIG. 3, when the aircraft B transfers the group sensor control authority to the aircraft C, the aircraft B becomes No in Step S8, and the aircraft C becomes Yes in Step S10. That is, since the group sensor control authority is transferred from the aircraft B to the aircraft C, the aircraft C becomes the master aircraft that executes the sensor control by the group sensor. Further, the aircraft B is the follower aircraft that executes sensor control by the group sensor. That is, the control results and roles of the aircraft B and the aircraft C are exchanged.

From the above, the aircraft A functions as the master aircraft of the aircraft A. The aircraft B functions as the follower aircraft of the aircraft B and the aircraft C. The aircraft C functions as the master aircraft of the aircraft B and the aircraft C. The aircraft D functions as the master aircraft of the aircraft D.

Next, as shown in the upper side of FIG. 4, when the aircraft C leaves the communication network from the state shown in the lower side of FIG. 3, the aircraft C becomes No in Step S1 and the aircraft B becomes Yes in Step S8. That is, since the group sensor control authority is transferred from the aircraft C to the aircraft B, the aircraft B returns as the master aircraft that executes the sensor control by the group sensor. Meanwhile, since the aircraft C leaves the communication network, the aircraft C becomes the master aircraft that independently executes sensor control like the aircraft A.

From the above, the aircraft A functions as the master aircraft of the aircraft A. The aircraft B functions as the master aircraft of the aircraft B. The aircraft C functions as the master aircraft of the aircraft C. The aircraft D functions as the master aircraft of the aircraft D.

Next, as shown in the lower side of FIG. 4, when the aircraft A joins the communication network from the state shown in the upper side of FIG. 4, the aircraft A has a higher order of priority than that of the aircraft B, and thus, the group sensor control authority is transferred from the aircraft B to the aircraft A. That is, the aircraft A is Yes in Step S1, Yes in Step S4, Yes in Step S6, and Yes in Step S8. Therefore, the aircraft A becomes the master aircraft that executes the sensor control by the group sensor. Meanwhile, the aircraft B is the follower aircraft that executes the sensor control by the group sensor.

From the above, the aircraft A functions as the master aircraft of the aircraft A and the aircraft B. The aircraft B functions as the follower aircraft of the aircraft A and the aircraft B. The aircraft C functions as the master aircraft of the aircraft C. The aircraft D functions as the master aircraft of the aircraft D.

As described above, the aircraft 10 uses a predetermined order of priority as a transfer rule, and transfers the group sensor control authority between the aircraft according to this transfer rule.

As described above, the group sensor control system 1 described in the present embodiment is grasped as follows, for example.

According to a first aspect, there is provided a group sensor control system 1 controlling a plurality of sensors 21 installed in each of a plurality of aircraft 10 as a group sensor, the group sensor control system 1 including: the sensor 21 that is mounted on each of the plurality of aircraft

10 to detect an object to be detected; a sensor control unit (sensor controller) 23 that is mounted on each of the plurality of aircraft 10 to control the sensor 21; and a communication unit (transmitter/receiver) 24 that is mounted on each of the plurality of aircraft 10, in which the communication unit 24 is communicable with the communication units 24 of other aircraft 10 and forms a communication network between the communication units 24 of the plurality of aircraft 10 by communication, a plurality of the sensor control units 23 share, via the communication network, setting information of a master aircraft which is a main aircraft among the plurality of aircraft 10 and in which a master authority is set and of a follower aircraft which is a follower of the master aircraft, and the sensor control unit 23 of the master aircraft transmits instruction information for providing an instruction for a control policy of the group sensor to the sensor control unit 23 of the follower aircraft via the communication network, and the sensor control unit 23 of the follower aircraft executes a control of the sensor 21 based on the instruction information received via the communication network.

According to this configuration, the sensor control unit 23 of the plurality of aircraft 10 can control the sensor 21 based on the instruction information 28. Therefore, even when any of the aircraft 10 leaves the communication network, the sensor control unit 23 can continue to control the sensor 21 based on the instruction information 28. Therefore, the group sensor control system 1 having high redundancy can be obtained.

As a second aspect, an order of priority is assigned to the plurality of aircraft 10 in advance, and the plurality of sensor control units 23 share information on the order of priority via the communication network, and each of the plurality of sensor control units 23 shares the setting information by setting the aircraft 10 having a highest order of priority as the master aircraft and setting the aircraft 10 other than the master aircraft as the follower aircraft.

According to this configuration, the master aircraft and the follower aircraft can be easily set based on the order of priority.

As a third aspect and a fifth aspect, the sensor control unit 23 of the master aircraft has the master authority (group sensor control authority) for transmitting the instruction information 28, and when it is determined that a condition for transferring the master authority to any one of the follower aircraft is satisfied, the sensor control unit 23 of the master aircraft transfers the master authority to the follower aircraft according to a transfer rule which is predetermined.

According to this configuration, the master aircraft and the follower aircraft can be exchanged according to the transfer rule. Therefore, even when the aircraft 10 leaves or joins the communication network, the master aircraft and the follower aircraft can be appropriately set.

As a fourth aspect and a sixth aspect, an order of priority is assigned to the plurality of aircraft 10 in advance, and the transfer rule is the order of priority.

According to this configuration, it is possible to make a simple transfer rule based on the order of priority.

As a seventh aspect, when the master aircraft leaves the communication network, the master authority is transferred to the follower aircraft having a highest order of priority among the follower aircraft remaining in the communication network before the master aircraft leaves the communication network.

According to this configuration, even when the master aircraft leaves the communication network, the master aircraft can remain in the communication network by transferring the master authority to the follower aircraft.

As an eighth aspect, in a case where the aircraft 10 joins the communication network, the sensor control unit 23 of the master aircraft transfers the master authority to the joined aircraft when it is determined that the order of priority of the joined aircraft 10 is highest.

According to this configuration, even when the aircraft 10 joins the communication network, the master authority can be transferred to the joined aircraft 10 based on the order of priority, and thus, a return can be appropriately achieved.

REFERENCE SIGNS LIST

1: group sensor control system
4: target object
5: target group
10: aircraft
11: sensor device
21: sensor
22: signal processor
23: sensor controller
24: transmitter/receiver
28: rule

The invention claimed is:

1. A group sensor control system controlling a plurality of sensors installed in each of a plurality of aircraft as a group sensor, the group sensor control system comprising:
the sensor that is mounted on each of the plurality of aircraft to detect an object to be detected;
a sensor control unit that is mounted on each of the plurality of aircraft to control the sensor; and
a communication unit that is mounted on each of the plurality of aircraft,
wherein the communication unit is communicable with the communication units of other aircraft and forms a communication network between the communication units of the plurality of aircraft by communication,
a plurality of the sensor control units share, via the communication network, setting information of a master aircraft which is a main aircraft among the plurality of aircraft and in which a master authority is set and of a follower aircraft which is a follower of the master aircraft, and
the sensor control unit of the master aircraft transmits instruction information for providing an instruction for a control policy of the group sensor to the sensor control unit of the follower aircraft via the communication network, and the sensor control unit of the follower aircraft executes a control of the sensor based on the instruction information received via the communication network.

2. The group sensor control system according to claim 1,
wherein an order of priority is assigned to the plurality of aircraft in advance, and
the plurality of sensor control units share information on the order of priority via the communication network, and each of the plurality of sensor control units shares the setting information by setting the aircraft having a highest order of priority as the master aircraft and setting the aircraft other than the master aircraft as the follower aircraft.

3. The group sensor control system according to claim 2,
wherein the sensor control unit of the master aircraft has the master authority for transmitting the instruction information, and when it is determined that a condition for transferring the master authority to any one of the follower aircraft is satisfied, the sensor control unit of the master aircraft transfers the master authority to the any one of the follower aircraft according to a transfer rule which is predetermined.

4. The group sensor control system according to claim 3, wherein the transfer rule is the order of priority.

5. The group sensor control system according to claim 1, wherein the sensor control unit of the master aircraft has the master authority for transmitting the instruction information, and when it is determined that a condition for transferring the master authority to any one of the follower aircraft is satisfied, the sensor control unit of the master aircraft transfers the master authority to the follower aircraft according to a transfer rule which is predetermined.

6. The group sensor control system according to claim 5, wherein an order of priority is assigned to the plurality of aircraft in advance, and
the transfer rule is the order of priority.

7. The group sensor control system according to claim 4, wherein when the master aircraft leaves the communication network, the master authority is transferred to the follower aircraft having a highest order of priority among the follower aircraft remaining in the communication network before the master aircraft leaves the communication network.

8. The group sensor control system according to claim 4, wherein in a case where an aircraft joins the communication network, the sensor control unit of the master aircraft transfers the master authority to the joined aircraft when it is determined that the order of priority of the joined aircraft is highest.

9. The group sensor control system according to claim 6, wherein when the master aircraft leaves the communication network, the master authority is transferred to the follower aircraft having a highest order of priority among the follower aircraft remaining in the communication network before the master aircraft leaves the communication network.

10. The group sensor control system according to claim 6, wherein in a case where the aircraft joins the communication network, the sensor control unit of the master aircraft transfers the master authority to the joined aircraft when it is determined that the order of priority of the joined aircraft is highest.

* * * * *